United States Patent
Hodge

(10) Patent No.: US 12,166,891 B2
(45) Date of Patent: Dec. 10, 2024

(54) SYSTEM AND METHOD FOR CUSTOMIZING INMATE COMMUNICATION NOTIFICATION

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 18/195,576

(22) Filed: May 10, 2023

(65) Prior Publication Data

US 2023/0353369 A1 Nov. 2, 2023

Related U.S. Application Data

(63) Continuation of application No. 17/165,661, filed on Feb. 2, 2021, now Pat. No. 11,677,558, which is a
(Continued)

(51) Int. Cl.
*H04M 1/67* (2006.01)
*G06F 16/23* (2019.01)
(Continued)

(52) U.S. Cl.
CPC ............ *H04L 9/3231* (2013.01); *G06F 16/23* (2019.01); *G06F 16/435* (2019.01); *H04M 1/67* (2013.01);
(Continued)

(58) Field of Classification Search
CPC ........ G06F 16/23; G06F 16/435; G06F 16/30; G06F 40/35; G06Q 20/108; G10L 15/18; H04L 9/3231; H04L 12/1818; H04L 51/00; H04L 65/1073; H04L 67/14; H04L 67/535; H04L 65/1076; H04M 1/642; H04M 1/66; H04M 1/67; H04M 3/2218; H04M 3/382; H04M 3/42042; H04M 3/42051; H04M 3/42059; H04M 3/42068; H04M 3/42093; H04M 3/4211; H04M 3/42153; H04M 3/4288; H04M 3/436; H04M 3/53333;
(Continued)

(56) References Cited

U.S. PATENT DOCUMENTS 5,787,151 A 7/1998 Nakatsu et al.
5,926,533 A 7/1999 Gainsboro
(Continued)

*Primary Examiner* — Gerald Gauthier
(74) *Attorney, Agent, or Firm* — Sterne, Kessler, Goldstein & Fox P.L.L.C.

(57) ABSTRACT

The present disclosure provides details of a system and method for customizing an inmate communication notification. Such a system provides an inmate different customized notification messages to be played to different called parties. The system includes a list of different contacts, and each of the contacts can be associated with one or more contact numbers. Each contact number is associated with one or more customized notification messages. The customized notification messages include terms, phrases, and sentences that draw the called party's attention and sound familiar to the called party. The customized notification messages include customized text files, audio files, and video files. An inmate chooses one or more customized notification messages to be played to a called party.

20 Claims, 8 Drawing Sheets

Related U.S. Application Data continuation of application No. 15/839,434, filed on Dec. 12, 2017, now Pat. No. 10,917,241, which is a continuation of application No. 15/616,459, filed on Jun. 7, 2017, now Pat. No. 9,843,448.

(51) Int. Cl.

| | |
|---|---|
| *G06F 16/435* | (2019.01) |
| *H04L 9/32* | (2006.01) |
| *H04M 3/22* | (2006.01) |
| *H04M 3/38* | (2006.01) |
| *H04M 3/42* | (2006.01) |
| *H04M 3/428* | (2006.01) |

(52) U.S. Cl.
CPC ......... *H04M 3/2218* (2013.01); *H04M 3/382* (2013.01); *H04M 3/42042* (2013.01); *H04M 3/42051* (2013.01); *H04M 3/42068* (2013.01); *H04M 3/42093* (2013.01); *H04M 3/4211* (2013.01); *H04M 3/42153* (2013.01); *H04M 3/4288* (2013.01); *H04M 2203/6081* (2013.01)

(58) Field of Classification Search
CPC ............... H04M 15/10; H04M 19/041; H04M 2203/6081; H04M 1/57; H04M 3/02; H04M 3/46; H04M 3/533
See application file for complete search history.

(56) References Cited

U.S. PATENT DOCUMENTS

| | | | |
|---|---|---|---|
| 6,067,348 A | 5/2000 | Hibbeler | |
| 6,101,242 A | 8/2000 | McAllister et al. | |
| 6,167,119 A | 12/2000 | Bartholomew et al. | |
| 6,295,346 B1 | 9/2001 | Markowitz et al. | |
| 6,421,439 B1* | 7/2002 | Liffick | H04M 3/436 |
| | | | 379/211.02 |
| 6,459,776 B1 | 10/2002 | Aktas et al. | |
| 6,606,596 B1* | 8/2003 | Zirngibl | H04M 3/493 |
| | | | 715/752 |
| 6,870,910 B1 | 3/2005 | Armstrong et al. | |
| 6,925,166 B1 | 8/2005 | Chan | |
| 7,054,428 B1 | 5/2006 | Berthoud et al. | |
| 7,099,312 B1 | 8/2006 | Contractor | |
| 7,181,493 B2 | 2/2007 | English et al. | |
| 7,333,933 B2* | 2/2008 | Brennan | H04M 3/533 |
| | | | 704/E15.044 |
| 7,529,357 B1 | 5/2009 | Rae et al. | |
| 7,904,067 B1 | 3/2011 | Tiwari et al. | |
| 7,933,775 B2* | 4/2011 | Quibria | H04M 3/46 |
| | | | 704/270.1 |
| 7,953,395 B1 | 5/2011 | Richardson et al. | |
| 8,027,447 B2 | 9/2011 | Sylvain | |
| 8,077,833 B2 | 12/2011 | Ray | |
| 8,848,879 B1* | 9/2014 | Coughlan | H04M 1/57 |
| | | | 455/567 |
| 8,868,424 B1* | 10/2014 | Moore | G06F 40/35 |
| | | | 704/235 |
| 9,007,420 B1 | 4/2015 | Passe | |
| 9,680,838 B1* | 6/2017 | Hodge | H04L 65/1073 |
| 9,692,718 B2* | 6/2017 | Bennett | H04L 51/00 |
| 9,699,305 B1* | 7/2017 | Compert | H04M 3/436 |
| 9,832,313 B1* | 11/2017 | Way | H04M 15/10 |
| 9,843,448 B1* | 12/2017 | Hodge | H04M 1/67 |
| 10,237,399 B1 | 3/2019 | Gainsboro et al. | |
| 10,237,404 B1 | 3/2019 | Way et al. | |
| 10,749,827 B2 | 8/2020 | Hodge | |
| 10,757,265 B2 | 8/2020 | Seyfetdinov | |
| 10,917,241 B2* | 2/2021 | Hodge | H04M 3/2218 |
| 11,677,558 B2* | 6/2023 | Hodge | H04M 3/42153 |
| | | | 379/88.22 |
| 2001/0026609 A1 | 10/2001 | Weinstein et al. | |
| 2001/0036821 A1 | 11/2001 | Gainsboro et al. | |
| 2002/0071537 A1 | 6/2002 | Gainsboro | |
| 2003/0112949 A1 | 6/2003 | Brown et al. | |
| 2003/0134626 A1* | 7/2003 | Himmel | H04M 1/642 |
| | | | 455/567 |
| 2003/0219107 A1* | 11/2003 | Richardson | H04L 67/14 |
| | | | 348/14.08 |
| 2003/0219109 A1 | 11/2003 | Malik | |
| 2004/0174264 A1 | 9/2004 | Reisman et al. | |
| 2004/0213401 A1 | 10/2004 | Aupperle et al. | |
| 2005/0047560 A1 | 3/2005 | Mostad | |
| 2005/0047563 A1 | 3/2005 | Fellenstein et al. | |
| 2005/0063527 A1 | 3/2005 | Bury et al. | |
| 2006/0026277 A1 | 2/2006 | Sutcliffe | |
| 2006/0062355 A1 | 3/2006 | Leonard | |
| 2006/0062365 A1 | 3/2006 | Yeh et al. | |
| 2006/0215829 A1 | 9/2006 | Schwartz | |
| 2007/0026852 A1 | 2/2007 | Logan et al. | |
| 2007/0071206 A1 | 3/2007 | Gainsboro et al. | |
| 2007/0183440 A1 | 8/2007 | Bennet et al. | |
| 2007/0223663 A1 | 9/2007 | Benco et al. | |
| 2007/0258567 A1 | 11/2007 | Koch | |
| 2007/0297599 A1 | 12/2007 | Sylvain | |
| 2008/0008300 A1 | 1/2008 | Brandt et al. | |
| 2008/0137828 A1* | 6/2008 | Chmaytelli | H04M 1/66 |
| | | | 379/201.11 |
| 2008/0170672 A1* | 7/2008 | Cai | H04M 3/42059 |
| | | | 379/88.19 |
| 2008/0304640 A1 | 12/2008 | Reilly | |
| 2009/0086939 A1 | 4/2009 | Chatterjee | |
| 2009/0156265 A1 | 6/2009 | Sweeney et al. | |
| 2009/0234915 A1 | 9/2009 | Mikkelsen et al. | |
| 2010/0189228 A1 | 7/2010 | Seyfetdinov | |
| 2011/0276323 A1 | 11/2011 | Seyfetdinov | |
| 2012/0134480 A1 | 5/2012 | Leeds et al. | |
| 2013/0259028 A1 | 10/2013 | Skala | |
| 2015/0078540 A1 | 3/2015 | Virushabadoss et al. | |
| 2015/0081289 A1* | 3/2015 | Kurganov | G06F 16/30 |
| | | | 704/231 |
| 2015/0181031 A1 | 6/2015 | Warnack | |
| 2015/0201081 A1 | 7/2015 | Hodge et al. | |
| 2015/0229781 A1 | 8/2015 | Ashton | |
| 2015/0281433 A1 | 10/2015 | Gainsboro et al. | |
| 2015/0301838 A1* | 10/2015 | Steeves | H04M 3/42051 |
| | | | 715/708 |
| 2015/0381803 A1* | 12/2015 | Klemm | H04M 3/4211 |
| | | | 455/415 |
| 2016/0007201 A1 | 1/2016 | Torgersrud et al. | |
| 2017/0013135 A1* | 1/2017 | Alexander | H04L 67/535 |
| 2017/0041463 A1* | 2/2017 | Yaung | H04M 3/42042 |
| 2017/0041787 A1* | 2/2017 | Hodge | H04M 3/382 |
| 2018/0103153 A1 | 4/2018 | Torgersrud et al. | |
| 2018/0124125 A1* | 5/2018 | Thomasson | H04L 12/1818 |
| 2018/0218730 A1 | 8/2018 | Volkart | |
| 2018/0260455 A1 | 9/2018 | Olligschlaeger et al. | |
| 2018/0343342 A1 | 11/2018 | Dennison | |
| 2018/0359094 A1* | 12/2018 | Hodge | H04M 3/42093 |
| 2019/0014207 A1 | 1/2019 | Volkart | |
| 2019/0019264 A1* | 1/2019 | Hodge | G06Q 20/108 |
| 2019/0347668 A1 | 11/2019 | Williams et al. | |
| 2021/0234701 A1* | 7/2021 | Hodge | H04M 3/42051 |
| 2022/0116736 A1 | 4/2022 | Williams et al. | |
| 2022/0172171 A1 | 6/2022 | Skala | |
| 2022/0215495 A1 | 7/2022 | Hodge | |
| 2023/0353369 A1* | 11/2023 | Hodge | H04M 3/42042 |

* cited by examiner

Personal Information

| ID | Inmate Name | Birthday | Inmate SSN | ... |
|----|-------------|----------|------------|-----|
| 1 | John Rendell Smith | 01/01/1975 | 123456789 | ... |
| 2 | Jack Bauer | 02/18/1966 | 213456789 | ... |

Contact List

| Inmate SSN | Contact | Contact Number | Relationship to inmate | Audio File 1 | Text File1 | Media File1 | # of Calls | Security level | ... |
|------------|---------|----------------|------------------------|--------------|------------|-------------|------------|----------------|-----|
| 123456789 | Mom | 2222222222 | Parent | Smitty | Smitty | | 5 | normal | ... |
| 123456789 | Aunty Lily | 3333333333 | Relative | Johnny | John your nephew | Happy Birthday Aunt Lily | 1 | normal | ... |
| ... | ... | ... | ... | ... | ... | ... | ... | ... | ... |
| 213456789 | Daughter | 4444444444 | Child | Dad | | | | | |

Biometric Samples

| Inmate SSN | Voice Sample | Fingerprint | ... |
|------------|--------------|-------------|-----|
| 123456789 | VS-JRS | FP-JRS | ... |
| ... | ... | ... | ... |
| 213456789 | VS-JB | FP-JB | |

FIG. 2C

SYSTEM AND METHOD FOR CUSTOMIZING INMATE COMMUNICATION NOTIFICATION

CROSS-REFERENCE TO RELATED APPLICATIONS

This application is a continuation of U.S. patent application Ser. No. 17/165,661, filed Feb. 2, 2021, which is a continuation of U.S. patent application Ser. No. 15/839,434, filed Dec. 12, 2017, now U.S. Pat. No. 10,917,241, issued Feb. 9, 2021, which is a continuation of U.S. patent application Ser. No. 15/616,459, filed Jun. 7, 2017, now U.S. Pat. No. 9,843,448, issued Dec. 12, 2017, all of which are incorporated by reference herein in their entireties.

BACKGROUND

Field

The disclosure relates to a system and method for customizing inmate communication notification.

Background

Inmates incarcerated in a controlled environment are often allowed to communicate with contacts, e.g., family and friends, outside of the controlled environment. The communication between an inmate and an outside contact is often facilitated through a communication control system associated with the controlled environment. The conversation between the inmate and the outside contact can be monitored through the communication control system to ensure security.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

FIG. 2C illustrates database tables in a communication control center, according to embodiments of the present disclosure.

Figure 1:
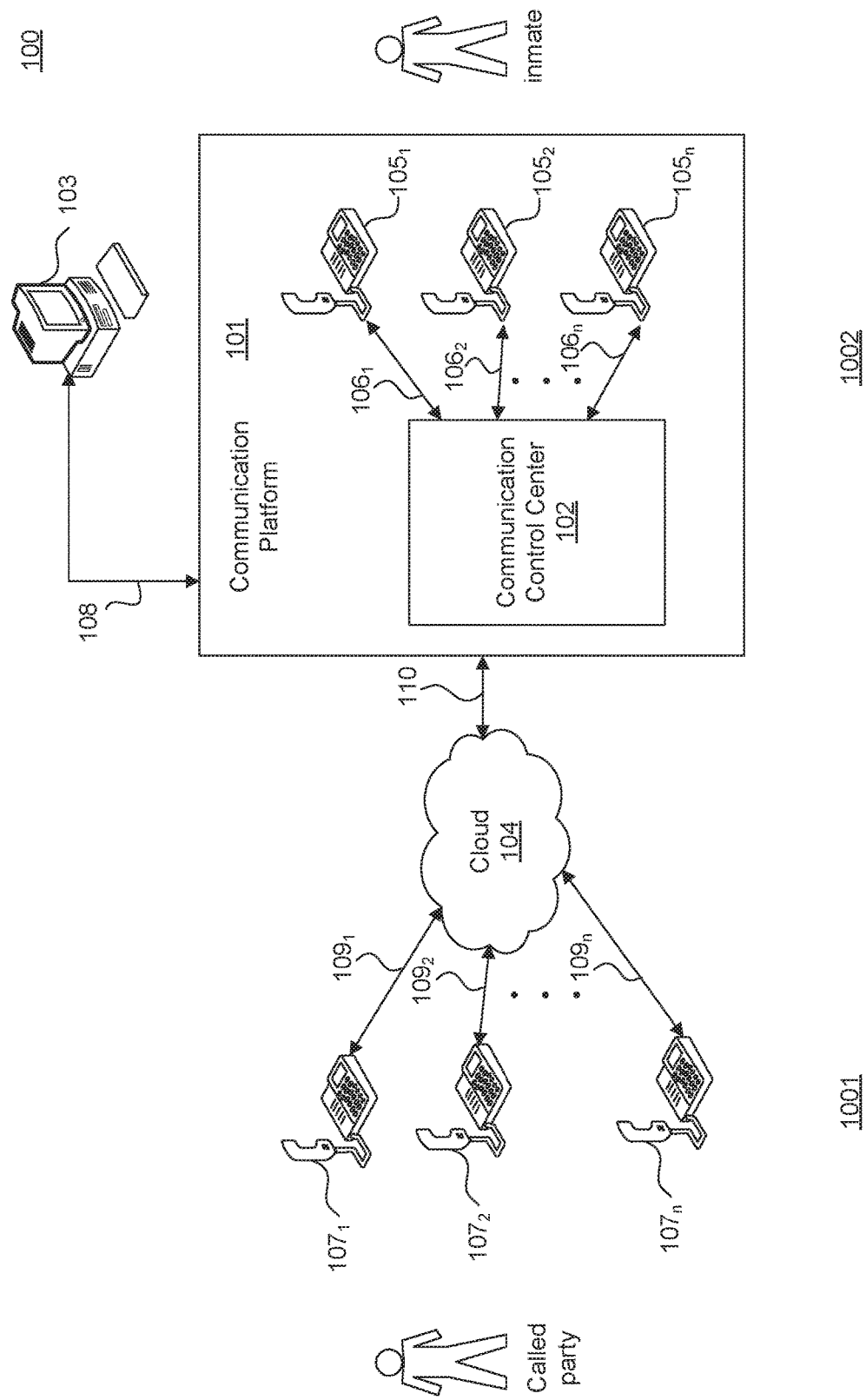
FIG. 1 illustrates a block diagram of an inmate communication notification customizing system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

As an outside contact receives a call from an inmate, the outside contact may not recognize the incoming call number or the caller name shown on the communication device, e.g., a phone. As a result, the outside contact may ignore the unrecognized call and the inmate is not able to contact the outside contact in time.

In light of the above, the present disclosure provides details of a system and method for customizing inmate communication notification. Such a system may provide an inmate different customized notification messages/files to be played to different called parties. The system includes a list of different contacts, and each of the contacts can be associated with one or more contact numbers. Each contact number can be associated with one or more customized notification messages. The customized notification messages include terms, phrases, and sentences that can draw the called party's attention and sound familiar to the called party. The customized notification messages can be in various formats, including customized text files, audio files, and video files. An inmate can choose one or more customized notification messages to be played to a called party. Thus, calls from the inmate can be easier to recognize, for different contacts.

System for Customizing Inmate Communication Notification

FIG. 1 illustrates a block diagram of an inmate communication notification customizing system 100, according to embodiments of the present disclosure. In an embodiment, as shown in FIG. 1, system 100 includes communication platform 101, communication control center 102 in communication platform 101, workstations 103, cloud 104, telephonic instruments 105 1-$n$, connections 106 1-$n$, telephonic instruments 107 1-$n$, connection 108, connections 109 1-$n$, and connection 110.

Communication platform 101, communication control center 102, workstations 103 1-$n$, connection 108, telephonic instruments 105 1-$n$, and connections 110 1-$n$ are arranged in a controlled environment 1002, e.g., a prison or correctional facility. Cloud 104, telephonic instruments 107 1-$n$, and connections 109 1-$n$ are arranged in an outside environment 1001, e.g., an environment outside of controlled environment 1002. Communication between controlled environment 1002 and outside environment 1001 is facilitated through communication platform 101 and cloud 104. Communication platform 101 is connected to workstations 103 via connection 108, and is connected to telephonic instruments 105 1-$n$ via connections 106 1-$n$. Communication platform 101 is connected to cloud 104 through connection 110, and cloud 104 is connected to telephonic instruments 107 1-$n$ through connections 109 1-$n$, respectively. Accordingly, in embodiments, communication platform 101 is connected to the telephonic instruments 107 1-$n$ via cloud 104. Thus, communication between a user or an inmate in controlled environment 1002 and a called party in outside environment 1001 is facilitated and monitored through the system 100.

Communication platform 101 includes any suitable software and hardware that facilitate communication between a user or an inmate in controlled environment 1002 and a called party/contact in outside environment 1001. Communication platform 101 includes a plurality of telephonic instruments 105 1-$n$ connected to communication control center 102. Telephonic instruments 105 1-$n$ include any suitable devices capable of bi-directionally communicating with communication control center 102, such as telephones, mobile devices, computers, and kiosks. Telephonic instruments 105 1-$n$ are connected to communication control center 102 through connections 106 1-$n$, respectively.

Communication control center 102 is connected to various workstations 103 via bi-directional connection 108. Workstations 103 include investigative workstations, administrative workstations, and other functional workstations. Workstations 103 are accessible to authorized staff/officers in controlled environment 1002 so that authorized staff/officers can monitor and control activities conducted through communication platform 101.

Cloud 104 facilitates communication between controlled environment 1002 and outside environment 1001. Cloud 104 includes any suitable software and hardware that allow bi-directional data, i.e., digital and analog data, to be transmitted between communication platform 101 and telephonic instruments 107 1-$n$. Telephonic instruments 107 1-$n$ in outside environment 1001 include any suitable devices, e.g., telephones, mobile devices, and computers, capable of receiving one or more of telephone calls, internet calls, audio files, video files, and text files.

Cloud 104, connections 109 1-$n$, and telephonic instruments 107 1-$n$ can be included entirely or partially in a public switched telephone network (PSTN). Cloud 104 accordingly transmits data to telephonic instruments 107 1-$n$ via connections 109 1-$n$, which include telephone lines, fiber optic cables, microwave transmission links, cellular networks, communication satellites, undersea telephone cables, and/or any suitable means interconnected by switching centers in the PSTN. Cloud 104, connections 109 1-$n$, and telephonic instruments 107 1-$n$ may also be entirely or partially included in a plain old telephone service (POTs). POTs allows analog voice signals to be transmitted from communication platform 101 to the telephonic instruments 107 1-$n$ through connections 109 1-$n$, wherein connections 109 1-$n$ include telephone cables.

Connection 110 between communication platform 101 and could 104 includes any suitable wired (e.g., Ethernet) connection or wireless connection. The wireless connection can be implemented as one or more of a wide-area network (WAN) connection, a local area network (LAN) connection, the Internet, a Bluetooth connection, and/or an infrared connection. Other types of implementations for a wired or wireless connection are possible without deviating from the scope of the present disclosure. Connection 108 and connections 106 1-$n$ includes one or more of a WAN connection, a LAN connection, a Bluetooth connection, fiber optics, and/or an infrared connection. At least one routing device, e.g., a router, and a data control device, e.g., a gateway, are arranged between communication platform 101 and cloud 104.

Communication control center 102 includes any suitable computer systems capable of controlling communication between a user, e.g., an inmate, through a telephonic instrument 105 $n$, and other parts of the system 100. That is, for example, communication control center 102 controls the communication between an inmate and a contact/called party in outside environment 1001, and controls the communication between an inmate and workstations 103 in controlled environment 1002. Communication control center 102 includes, at least, a plurality of servers for processing communication-related data and other data, and a database for storing profiles and relevant information of inmates.

Database of communication control center 102 stores profile and relevant information of each inmate. For example, data of each inmate, stored in the database, includes registration data such as the legal name, birthday, social security number (SSN), biometric samples/features, PIN numbers, etc. The biometric samples include, e.g., voice samples, fingerprints, retinal samples, facial structure, etc. Unique information such as biometric samples, PIN number, and SSN of an inmate are associated with the identity of the inmate and can thus be used to authenticate registration and identity of the inmate. Communication control center 102 extracts unique biometric feature data from biometric samples, stores the biometric samples as registered biometric samples, and uses the unique biometric feature data to authenticate an inmate's registration/identity.

Optionally, database of communication control center 102 also stores a contact list associated with an inmate. Using a telephonic instrument 105 $n$, an inmate has the option to store a new phone number into the contact list and name the contact using a desired name. For example, after a call has ended, the telephonic instrument 105 $n$ displays or plays a question "Do you want to store the number into the contact list? Press 1 to store. Press 2 to decline". The inmate can choose to store the phone number or decline. The contact list includes a list of existing contacts of the inmate. In an embodiment, the contact list also includes customized audio/text files associated with the contacts. The contact list is uniquely associated with the inmate or inmate's unique information such as legal name, SSN, and biometric feature data. The contacts in the contact list can have any proper names without violating the security protocols in controlled environment 1002. For example, the inmate whose legal name is John Rendell Smith has a contact list that contains contacts "Mom", "Aunty Lily", "Baby Will", "Home", "George", and "Sister". A name should not contain any suspicious or sensitive terms or jargons. The inmate may store one or more contact numbers for each contact name. For example, an inmate stores a house phone number and a cell phone number under contact "Mom".

In certain embodiments, the contact list also includes customized media files. A media file includes proper greetings from an inmate. To ensure security, in various embodiments, a media file is recorded under the supervision of authorized officers/staff of controlled environment 1002. Content, language, and gestures in the media file should be checked before being available by authorized officers/staff and/or communication control center 102 to ensure the media file includes no suggestive language/gestures and no violation of the security protocols of the controlled environment 1002.

Optionally, an inmate can also store one or more customized audio files, text files, and media files, associated with a desired contact or contact number. For example, an inmate can create an audio file, a media file, and/or a text file, on a telephonic instrument 105 $n$. The contents of the customized files should not violate the security protocols and rules in controlled environment 1002. For example, an inmate can record a voice message for a desired contact and store the voice message under the contact. The voice message contains notification information that draws the contact's attention, e.g., a nickname of the inmate that is familiar to the contact. An inmate can also create a video message through a telephonic instrument 105 $n$ for a desired contact and store the video message under the contact. The video message contains a proper greeting message from the inmate, and optionally a nickname of the inmate that is familiar to the contact. An inmate can also create a text message through a telephonic instrument 105 $n$ for a desired contact and store the text message under the contact. The text message contains information that draws the attention of the contact, e.g., a nickname of the inmate that is familiar to the contact. The text file is displayed on a display of the telephonic instrument 107 $n$ used by the called party/contact. The audio file is played as voice and the media file is played on the display or screen of the telephonic instrument 107 $n$ as video.

Optionally, the number of times an inmate calls a contact is recorded and stored in communication control center 102. A contact number newly added into the contact list is investigated by the staff/officers in controlled environment 1002 such that the security level of the contact number can be flagged as "normal", "abnormal", "dangerous", and the like, depending on the investigation and/or behavior pattern of the inmate. For example, if the investigation of the number shows the number is a suspicious number, or if the behavior pattern of the inmate violates security rules of controlled environment 1002, communication control center 102 sends an alert to the staff/officers of controlled environment 1002 so that the staff/officers can act accordingly. In an example, a phone number is labeled as "normal" and the phone number of times an inmate calls a contact is recorded. A security rule defines that if an inmate calls a contact number more than 20 times a week, an alert is sent to administrative workstation and investigative workstation. If the inmate calls the contact more than 20 times a week, the security level of the contact is automatically flagged as "abnormal", and an alert is sent to investigative workstation and administrative workstation to notify the staff/officers. Further, the staff/officers start the investigation of the inmate and the contact number. In another example, notified that a certain contact number can be a dangerous phone number, the officers/staff searches the contact numbers of all inmates, in communication control center 102. If a match of the dangerous phone number is found, the staff/officers labels the contact associated with the contact number as "dangerous", and start investigating the inmate associated with the contact.

A telephonic instrument 105 $n$ includes any suitable device capable of establishing bi-directional communication connections between a user, e.g., an inmate, and communication control center 102. A telephonic instrument 105 $n$ can be one or more of a mobile device, a kiosk, a telephone, a conventional telephone, and a computer. A telephonic instrument 105 $n$ includes suitable software and hardware that are capable of facilitating interactions between an inmate and communication control center 102. A telephonic instrument 105 $n$ also includes suitable communication software and hardware for connecting to outside environment 1001 through communication control center 102. For example, a telephonic instrument 105 $n$ displays instructions from communication control center 102 and receives inputs from an inmate. A telephonic instrument 105 1-$n$ includes biometric sensors to detect certain biometric features of an inmate. The detected biometric features are processed and stored in communication control center 102. The telephonic instruments 105 1-$n$ are connected to the internal or local network of controlled environment 1002.

An inmate needs to be registered with communication control center 102 to make phone calls and conduct other authorized activities. A registration process is conducted on a plurality of telephonic instruments 105 $n$ that are closely monitored, through staff/officers and/or surveillance cameras. In an embodiment, a registration process includes storing certain information, e.g., biometric features, PIN, SSN, and birthday, into the communication control pane 102. The biometric features are stored as registered biometric samples of the inmates. A biometric sample or registered biometric sample of an inmate is detected by a telephonic instrument 105 $n$ and processed and stored in communication control center 102, to be stored with other personal information, e.g., PIN and legal name, of the inmate. The registered information uniquely and truly reflects the identity of an inmate.

In an example, an inmate has registered with communication control center 102 such that communication control center 102 stores profile and relevant information, i.e., various personal information and biometric samples of the inmate. The inmate starts a contact request by dialing the called party's phone number or pressing a designated button, on a telephonic instrument 105 $n$. Further, communication control center 102 prompts the inmate to authenticate his/her identity by entering one or more of his/her personal information, such as PIN number, birthday, SSN, etc. Suitable biometric inputs, such as fingerprint and retina scan, are also prompted to be entered. The personal information and/or biometric inputs provided by the inmate are compared with the registered personal information and biometric samples stored in communication control center 102 to authenticate the identity of the inmate. In an example, an inmate whose legal name is "John Rendell Smith" is prompted to provide a voice input and enter his SSN. Further, the inmate accordingly speaks out his legal name "John Rendell Smith". The voice input of the spoken legal name is detected by a voice-detecting sensor, recorded by the telephonic instrument 105 $n$, and sent to communication control center 102. Communication control center 102 compares the inputted SSN and the voice input with the registered SSNs and voice samples stored in communication control center 102, and locates a match between the voice input and a registered voice sample associated with an inmate whose legal name is "John Rendell Smith". Communication control center 102 then authenticates the identity of the inmate as John Rendell Smith.

In other various examples, an inmate is prompted to provide other speech-independent features and information to authenticate registration. For example, an inmate is prompted to provide his/her fingerprint and birthday. A fingerprint sensor captures the fingerprint of the inmate and the telephonic instrument 105 $n$ sends the captured fingerprint image, together with the birthday date entered by the user, to communication control center 102. Communication control center 102 then determines whether a match exists based on the inputs. It should be known to those skilled in the art that the choices of different identity authentication methods and method combinations can be flexibly determined depending on different application requirements. In various embodiments, the voice inputs can also be any other suitable words, phrases, and sentences that truly reflects the inmate's voice.

In another embodiment, the registration process takes place during a contact request. For example, when an inmate, having no registered voice sample stored in communication control center 102, starts a contact request, communication control center 102 prompts the inmate to provide a voice input. When communication control center 102 finds no matching registered voice sample to the voice input, communication control center 102 informs the inmate that the inmate is not registered and provides the inmate the option to register. If the inmate chooses to register now, the registration process starts. If the inmate chooses not to register now, the inmate is given the option to hang up the telephonic instrument 105 $n$.

The registered voice sample can be updated by the inmate or authorized staff/officers. For example, if the voice of an inmate has changed temporarily or permanently, the inmate can request to update his/her voice. Optionally, the request to update registered voice sample needs to be permitted by authorized staff/officers in controlled environment 1002. An inmate can also choose a more desired voice sample to be registered and stored. If an inmate is released from controlled environment 1002, authorized staff/officers can choose to remove the inmate's registered voice sample and customized files from communication control center 102, move the registered voice sample and the customized files to another suitable database, or label the status of the registered voice sample and the customized files as "deactivated" and the like. Thus, during a voice authentication process of a present inmate, the registered voice samples associated with released inmates are not searched to match the voice input. Thus, voice authentication can be more efficient.

In various embodiments, the registered voice samples include any suitable words, phrases, and sentences that clearly and accurately reflect the voice spectrogram and voiceprint, of inmates. The content of the voice samples should not violet any security protocols in controlled environment 1002. For example, a registered voice sample includes the legal name of an inmate or any suitable words the inmate would like the called party to hear.

After a match has been located between an inmate's voice input and a registered voice sample, the contact request is approved. Communication control center 102 further provides one or more customized audio files, text files, and media files associated with the called party/contact's number, and provides the inmate the options to choose a reasonable number of desired file to be displayed or played to the called party. The inmate can choose a desired file and communication control center 102 further starts dialing the called party's number. Accordingly, a telephonic instrument 107 $n$ associated with the called party's number shows an incoming call from the inmate. If a customized text file is chosen, the telephonic instrument 107 $n$ displays there is an incoming call associated with the content of the text file. After the called party answers the call, the chosen customized audio file or video file, if any, is played to the called party. The audio file and the media file are played to the called party by a telephonic instrument 107 $n$ when connection is established. The audio files are played in a call announcement such that it is easier for the called party to know who is calling. The media file are played to the called party after the called party has accepted the call.

In an embodiment, an inmate, having a legal name of John Rendell Smith, calls a called party through a landline. The called party knows the inmate as "Johnny". The legal name "John Rendell Smith" is stored in communication control center 102 as the registered voice sample of the inmate. The inmate starts the call by dialing the phone number of with the landline on a telephonic instrument 105 *n*, a conventional telephone. Communication control center 102 receives the phone number and further prompts the inmate to provide a voice input to authenticate his identity, through the telephonic instrument 105 *n*. After receiving voice input, e.g., "John Rendell Smith", communication control center 102 starts searching for a registered voice sample that matches the voice input. After communication control center 102 locates a registered voice sample that matches the voice input, communication control center 102 provides the inmate the options to choose a customized file to be played to the called party. Further, the inmate chooses an audio file or voice file containing a nickname known by the called party, e.g., voice of "Johnny", and a text file includes the text of the nickname, e.g., text of "Johnny". After the inmate has chosen the audio file and the text file, communication control center 102 dials the phone number associated with the landline. The screen of the landline shows an incoming call from "Johnny". After the called party answers the phone, a call announcement is played by the landline to the called party "you have a prepaid call from Johnny, an inmate at xyz correctional facility. To accept the call, dial 5 now, or, to decline the call, hang up now". The voice "Johnny" in the call announcement is contained in the chosen audio file. The called party can choose from the options accordingly.

In another embodiment, the inmate calls another called party though a cell phone. The called party knows the inmate as "Smitty". The inmate chooses an audio file containing the voice of "Smitty", and chooses a text file containing the text of "Smitty". The inmate also chooses a media file that includes a greeting video made by the inmate. When communication control center 102 dials the number of the called party, the screen of the cell phone of the called party shows an incoming call from "Smitty". After the called party answers the phone, a call announcement is played by the cell phone to the called party "you have a prepaid call from Smitty, an inmate at xyz correctional facility. To accept the call, dial 5 now, or, to decline the call, hang up now". The voice "Smitty" in the call announcement is contained in the chosen audio file. The called party accepts the call, and the media file, i.e., the greeting video, is played to the called party on the cell phone.

In another embodiment, the inmate calls another party through a cell phone. The inmate is registered with communication control center 102 and has no customized nickname stored associated with the called party's cell phone number. When communication control center 102 dials the number of the called party, the screen of the cell phone of the called party shows an incoming call from "John Rendell Smith". After the called party answers the phone, a call announcement is played by the cell phone to the called party "you have a prepaid call from John Rendell Smith, an inmate at xyz correctional facility. To accept the call, dial 5 now, or, to decline the call, hang up now". Because no customized files are chosen, the text file and the audio file of "John Rendell Smith" are provided as the inmate's legal name stored in communication control center 102. In certain embodiments, the text file only shows the phone number of the nearest switchboard or the IP address of the regional router, or "unknown caller". In various embodiments, the inmate can also decline the choices of any customized files when making a phone call.

It is appreciated by those skilled in the art that the customized text files, audio files, and media files are editable and can be customized separately. Content of each text file, media file, and audio file can be same or different. Contents of the customized files are scanned by communication control center 102 to ensure no violation of security rules occur. In addition, conversation between an inmate and the called party is monitored automatically or manually in real-time, and can be recorded if needed. The customized text files, audio files, and media files can be accessed by authorized staff/officers of controlled environment 1002, and can be automatically checked/scanned for potential suspicious behavior/terms using desired filtering features/algorithm. For example, authorized staff/officers can monitor, record, and access files of each inmate from workstations 103.

In an example, an inmate having the legal name John Rendell Smith has a contact named "Aunty Lily". The inmate stores two phone numbers, i.e., a home landline number and a cell phone number, under the contact "Aunty Lily". The inmate stores a text message, a voice message, and a video message under the contact. The text message includes the text of a nickname "Johnny", familiar to the contact named "Aunty Lily". The voice message includes the voice of nickname "Johnny", and the video message includes a greeting message of "Happy Birthday, Aunty Lily". When inmate John Rendell Smith initiates a call from a kiosk 105 *n* to the home landline number of contact "Aunty Lily", after communication control center 102 approves the contact request, inmate John Rendell Smith selects to display/play the text message and the voice message to contact "Aunty Lily". The home telephone of contact "Aunty Lily" shows an incoming call from "Johnny". After contact "Aunty Lily" picks up the phone, a call announcement is played to contact "Aunty Lily" "You have a prepaid call from Johnny, an inmate at xyz correctional facility. To accept the call, dial 5 now. To decline the call, hang up now". After contact "Aunty Lily" accepts the call, the inmate can start a conversation with contact "Aunty Lily".

In another example, when inmate John Rendell Smith initiates a call to the cell phone number of contact "Aunty Lily", after communication control center 102 approves the contact request, inmate John Rendell Smith selects to display/play the text message, the voice message, and the video message to contact "Aunty Lily". The cell phone of contact "Aunty Lily" shows an incoming call from "Johnny". After contact "Aunty Lily" picks up the phone, a call announcement is played to contact "Aunty Lily" "You have a prepaid call from Johnny, your nephew, an inmate at xyz correctional facility. To accept the call, dial 5 now. To decline the call, hang up now". After contact "Aunty Lily" accepts the call, the video message "Happy Birthday, Aunty Lily" is played on the cell phone. After the video message is played, the inmate starts a conversation with contact "Aunty Lily". In some embodiments, the video message can be sent to the called party as a request, and can be played after the called party accepts the request. In certain embodiments, the inmate can send a video message during a conversation.

Through communication platform 101, an inmate can make traditional phone calls and internet-based phone calls. The contact information and related customized audio/text/media files can be accessed through the telephonic instrument 105 *n*. When making a traditional phone call, an inmate enters a desired phone number associated with a called party on a telephonic instrument 105 *n*, or selects an existing contact from a contact list associated with the inmate. For example, an inmate presses a designated button on a telephonic instrument to send a contact request. After the contact request has been approved by communication control center 102, the inmate is given the option to choose an existing contact associated with his/her legal name and desired customized files to be played to the called party.

In another example, an inmate makes an internet-based phone call. After the contact request has been approved by communication control center 102, the inmate opens a desired communication software, and choose a desired contact from the contact list of the communication software. The inmate can chooses a desired number and further chooses desired customized files to be played to the called party.

When an inmate starts a contact request to an unknown called party, i.e., a phone number of which is not stored in communication control center 102, the inmate is prompted to authenticate registration. When registration is confirmed, the inmate is prompted to the options of entering customized audio/text/media files or continuing the call without customized files. In an example, if the inmate chooses to enter customized audio/text/media files, the inmate can follow instructions shown on the telephonic instrument 105 *n*, to create customized audio files, text files, and/or media files. After the call, the inmate is given the option to store the phone number as a new contact and the customized audio/text/media files to be associated with the new contact. The stored new contact is associated with the inmate's profile and relevant information. The inmate is also given the option to add more customized audio/text/media files or edit the existing customized audio/text/media files. In another example, if the inmate dials an unknown number without choosing any customized files, the text of legal name and the registered voice sample, are displayed and played to the called party, respectively.

Communication Platform

Figure 2A:
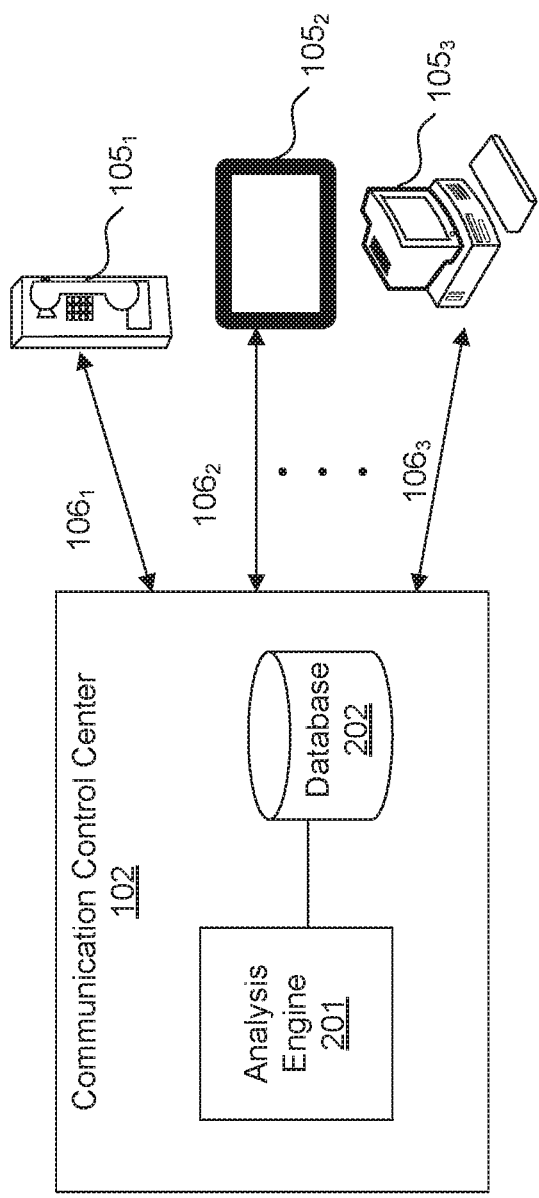
FIG. 2A illustrates a communication platform, according to embodiments of the present disclosure.

FIG. 2A illustrates a block diagram of a communication platform 101, according to embodiments of the present disclosure. In an embodiment, communication platform includes a communication control center 102, a plurality of telephonic instruments 105 1-*n*, and a plurality of connections 106 1-*n*. For illustrative purposes, only three telephonic instruments 105 1-3 and three connections 106 1-3 are shown in FIG. 2. Communication platform 101 is configured to facilitate bi-directional communication between a user or an inmate in controlled environment 1002 and another party in controlled environment 1002 or outside environment 1001.

Communication control center 102 includes an analysis engine 201 and a database 202. Analysis engine 201 processes communication information received from telephonic instruments 105 1-3 and from other systems/parts of controlled environment 1002. Analysis engine 201 can be implemented using one or more servers for receiving and processing communication data. For example, analysis engine 201 receives communication data from a telephonic device 105 1, processes the communication information, and establishes communication connection between telephonic instrument 105 1 and a telephonic instrument 107 *n* in outside environment 1001.

Analysis engine 201 is responsible for receiving an inmate's input, processing the input, responding to the input, and correlating the input information with existing information of an inmate that is already stored in database 202. For example, analysis engine 201 provides different options of actions for an inmate to choose after receiving an inquiry from the inmate. Analysis engine 201 connects the inmate with a called party in outside environment 1001 after authenticating the inmate's identity. Analysis engine 201 also stores an inmate's input, e.g., from a telephonic instrument 105 1, into the inmate's profile and relevant information in database 202. Analysis engine 201 searches database 202 to locate inmate's information. Analysis engine 201 also automatically checks the eligibility of information entered by an inmate, records communication related data, and stores data associated with an inmate's profile in database 202. Analysis engine 201 also generates new profile and stores the received information in the generated profile, in database 202.

Analysis engine 201 is controlled and accessed by authorized staff/officers in controlled environment 1002. For example, authorized staff/officers can access the analysis engine and monitor data and/or activities associated with inmates.

Database 202 includes data associated with the inmates and is searchable. Database 202 provides different types of information stored under or associated with each inmate such that an inmate can authenticate his/her identity by entering personal information and/or biometric data, to conduct authorized activities. For example, database 202 stores, at least, the legal name, birthday, social security number (SSN), biometric samples/features, and PIN number, of an inmate. The biometric samples include, e.g., facial structure, voice samples, fingerprints, retinal samples, etc. The biometric samples, PIN number, and SSN of an inmate are uniquely associated with the identity of an inmate, and can be used to authenticate the inmate's identity/registration. Other information, such as contacts, family members, customized files associated with contacts, can also be stored associated with corresponding inmates. Certain information associated with an inmate can be updated or edited by the inmate. Database 202 can be accessed and monitored by authorized staff/officers in controlled environment 1002.

Telephonic instruments 105 1-*n* include any suitable device capable of providing communication between an inmate and communication control center 102. As an example, telephonic instruments 105 1-3 include a telephone 105 1, a computer 105 2, and a kiosk 105 3, respectively. A telephonic instrument 105 *n* includes proper software and hardware for receiving an inmate's input, sending the input to communication control center 102, receiving a response communication control center 102, and displaying the response to the inmate.

Connections 106 1-*n* provide bi-directional connection between the telephonic instruments 105 1-*n* and communication control center 102. Connections 106 1-*n* can include any suitable computer networks or other communication networks via local area network (LAN) protocols, e.g., Ethernet, fiber optics, Asynchronous Transfer Mode (ATM), Token Ring, and Fiber Distributed Data Interface (FDDI). In an example, connections 106 1-3 include Ethernet.

In an embodiment, an inmate sends a contact request through telephonic instrument 105 3, a kiosk, by entering the contact's phone number. The contact request is routed to the analysis engine 201, and the analysis engine 201 prompts the inmate to provide a voice input and SSN after receiving the contact request. The kiosk 105 3 receives the response from the analysis engine 201 and displays the response to the inmate. The inmate further provides a voice input, e.g., voice of his/her legal name, and enters his/her SSN on the kiosk 105 3. The kiosk 105 3 receives the voice input and the SSN and sends the voice input and the SSN to analysis engine 201. After receiving the voice input and the SSN from the kiosk 105 3, the analysis engine 201 extracts voice feature, e.g., spectrogram, from the voice input, and compares the voice feature with the voice features of all voice samples stored in database 202. The analysis engine 201 also compares the inputted SSN with all the SSNs stored in the database. After a matching voice sample and a matching SSN are found, analysis engine 201 compares the legal name associated with the matching voice sample with the legal name associated with the matching SSN. If the legal names match, the identity of the inmate is authenticated. Otherwise, the analysis engine 201 prompts the inmate to re-enter his/her SSN and/or voice input, or end the session.

In another embodiment, after the identity of an inmate is authenticated, the analysis engine 201 provides an option of proceeding without choosing a customized file, e.g., customized audio files, text files, and media files, and an option of choosing one or more of customized files to be sent to the called party. The options are shown on the kiosk 105 3. The inmate properly chooses to send customized files. The analysis engine receives the inmate's choice, and accesses the inmate's profile and relevant information in database 202. The analysis engine 201 searches the entered phone number in the contact list associated with the inmate's legal name and locates a contact matching the phone number. The analysis engine 201 further returns the stored customized files associated with the contact. The kiosk 105 3 displays the existing customized files and accepts any choices the inmate makes. If the inmate chooses an existing customized file, the analysis engine 201 dials the contact's phone number, entered by the inmate, and sends the selected customized file. If the inmate chooses to enter a new customized file or edit an existing customized file, the analysis engine 201 receives the inmate's input and stores the inmate's input in the database 202.

Figure 2B:
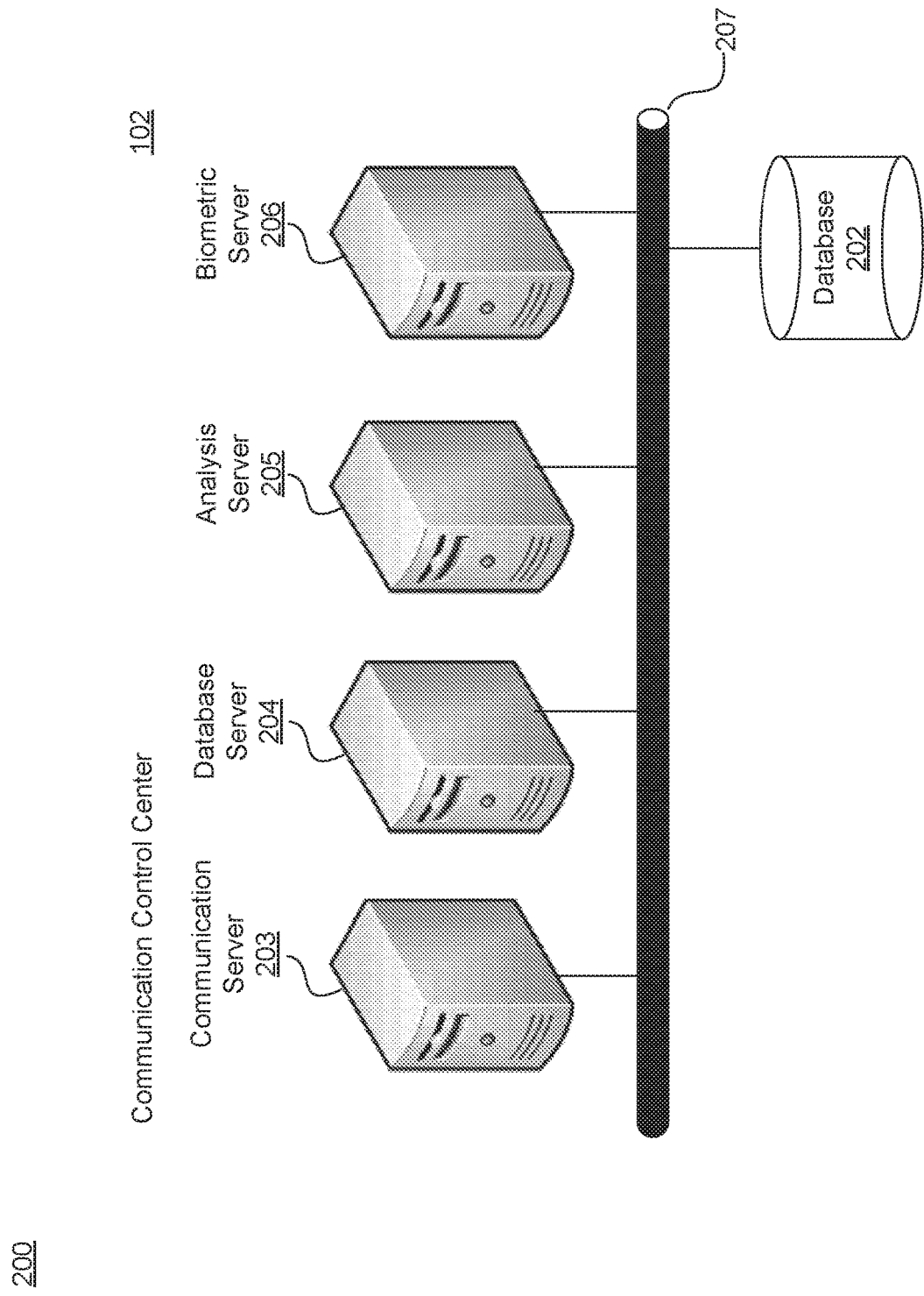
FIG. 2B illustrates a communication control center, according to embodiments of the present disclosure.

FIG. 2B illustrates a block diagram showing additional details of the elements described with respect to FIG. 2A. Only communication control center 102 is depicted in FIG. 2B.

In an embodiment, communication control center 102 includes communication server 203, database server 204, analysis server 205, biometric server 206, and database 202, all of which are connected to each other via a network bus 207. In another embodiment, the functions of communication server 203, database server 204, analysis server 205, biometric server 206, and database 202 are implemented within a single device. In an embodiment, database 202 is configured to store at least the profile and relevant information described with regard to FIG. 2A. Each of the servers 203-206 can be constructed as individual physical hardware devices, or as virtual servers. The number of physical hardware machines can be scaled to match the number of simultaneous user connections desired to be supported by communication control center 102.

In an embodiment, communication server 203 consists of one or more servers, and is configured to receive and transmit information to/from one or more telephonic instruments, e.g., telephonic instruments 105 1-n in controlled environment 1002 and the telephonic instruments 107 1-n in outside environment 1001. Communication server 203 receives information regarding inmates such as contact requests, recorded audio/video data, text data, real-time phone and video calls, images and videos, and personal information. Communication server 203 also receives real-time phone and video calls, images and videos from a called party. Communication server 203 can also receive inquiries from facilities and other parts in controlled environment 1002 requesting inmate information pertinent to an inmate. Communication server 203 forwards inquiries to analysis server 205 through network bus 207 for analysis of and generation of a response to the inquiry. Communication server 203 receives the response from analysis server 205 and forwards the response to the appropriate party. The communication server 203 communication with other parts/systems through computer networks or other communication networks via various communication protocols, such as transmission control protocol/internal protocol (TCP/IP), hyper text transfer protocol (HTTP), LAN, etc.

In an embodiment, communication server 203 is further configured to perform an authentication of inquiries to determine whether the submitting party is authorized to access the information located in database 202. If the party is authenticated, communication server 203 continues with the inquiry process by, for example, forwarding the inquiry to analysis server 205. Moreover, communication server 203 is further configured to encrypt and decrypt all communications transmitted and received by communication control center 102 for security purposes. In an embodiment, a party is authorized only to write data into database 202, only to read data from database 202, or authorized to both read data from and write data into database 202. In another embodiment, communication server 203 is configured to provide different levels of access to database 202 based on the type of party. Moreover, access to data within database 202 may vary based on the type of data to which access is sought. For example, one party can be authorized only to access certain types of data into database 202, such as the data that the party has uploaded. Another party can be authorized to access its data as well as data provide by other parties. The access by parties can be limited to read only, write only, or read/write based on the type of party, the type of data, or any other parameters related to the unified database system. For example, communication server 203 may be configured to allow read/write access to authorized staff/officers in controlled environment 1002 but only write access to inmates.

In an embodiment, database server 204 consists of one or more servers, and is configured to store and organize data in database 202. Database server 204 can be configured to run a database management system, such as MYSQL™. Database server 204 interfaces with database 202 to stores information provided to communication control center 102 by connected parties such as inmates and authorized officers/staff in controlled environment 1002. Such information may include various information about an inmate, such as the legal name, birthday, SSN, biometric samples/features, PIN number, contacts, family members, and customized files associated with contacts. The biometric samples include, e.g., facial structure, voice samples, fingerprints, retinal samples, etc. The biometric samples, PIN number, and SSN of an inmate are uniquely associated with the legal name of the inmate, and can be used to authenticate the inmate's registration and/or identity. Database server 204 can further be configured to provide information from database 202 to suitable connected parties who submit inquiries. Moreover, in some embodiments, database server 204 is configured to encrypt the information prior to storage to ensure security of the information.

In an embodiment, analysis server 205 consists of one or more servers, and functions as the primary logic processing center in inmate communication notification customizing system 100. For example, analysis server 205 parses incoming inquiries and inputs from an inmate, retrieves relevant information through database server 204, executes analysis based on the requested inquiry, generates reports and responses in response to the executed analysis, correlates received information with existing inmate profiles, updates existing inmate profiles, and generates new inmate profiles. As part of its functionality to conduct analysis of inquiries based on data in database 202, analysis server 205 can further be configured to manage and facilitate communication between communication server 203, database server 204, biometric server 206, and database 202.

Reports generated by analysis server 205 may include analytical reports and visual representations of an inmate's information such as charts illustrating an inmate's behaviors and graphs illustrating connections between an inmate and other parties or inmates, e.g., graphs illustrating outgoing calls made by an inmate in a particular time. Because analysis server 205 has access to database 202, which provides profiles and relevant information of inmates, analysis server 205 is capable of detecting connections and revealing patterns between inmates and called parties.

In an embodiment, biometric server 206 consists one or more servers, and is configured to process and/or store biometric data of inmates. Biometric data can include any information regarding an inmate's appearance, physical characteristics, or other identifying traits that may be unique to the inmate such as voice data, facial recognition data (2D or 3D), handwriting samples, retinal scan data, and fingerprint data. Biometric server 206 is configured to assist in analyzing audio/video data received from an inmate and authenticating the inmate's identification. For example, biometric server 206 can compare received audio/video data against stored biometric data.

Database 202 provides access to all available inmate information. In general, database 202 stores any data stored by communication server 203, database server 204, analysis server 205, biometric server 206. Because the data stored on database 202 may consume a significant amounts of storage space, database 202 may include a Network Attached Storage (NAS) device, which is configured as a mass storage device, or configured as a storage area network (SAN) comprising multiple storage devices. In order to reduce the required size, database 202 preferably includes a backup routine to transfer data to permanent storage devices, such as archival permanent storage or optical disks, after a predetermined time has elapsed since the initial recording of that data. Database 202 is connected to communication server 203, database server 204, analysis server 205, biometric server 206 by way of the network bus 207.

FIG. 2C illustrates profiles and relevant information of inmates stored in the database 202, according to embodiments of the present disclosure. For illustrative purposes, the profiles and relevant information of two inmates are depicted. It should be known to those skilled in the art that, the database tables shown in FIG. 2C are only exemplary. The number of inmates, naming of columns and rows, specific data structures and data arrangement should be determined based on different applications and design requirements. The database tables can be stored in one server or distributed in more than one server.

For example, database 202 includes a "Personal Information" table, a "Contact List" table, and a "Biometric Sample" table. "Personal Information" table contains, of each inmate, the identification (ID) number, the legal name, birthday, PIN number, SSN, cell number, and other related information. "Biometric Samples" table contains, of each inmate, a unique identifier of the inmate (e.g., SSN), legal name, voice sample, fingerprint, retinal scan, facial structure, etc. "Contact list" table contains, of each inmate, legal name, unique identifier (e.g., SSN), contacts, phone number of each contact, relationship to the inmate, customized audio files, customized text files, customized media files, number of calls within a specific period, security level, etc. Desired data structures, such as database pointers, indicated as the arrows in FIG. 2C, are used to point from a row to another and/or move among rows, to search for desired properties based on inquiries. Accordingly, data stored in different database tables can be connected and accessed by the analysis engine 201 for desired purposes.

For illustrative purposes, information associated with inmate "John Rendell Smith" in database tables are marked in bold to indicate correlation. In an embodiment, name of inmates are stored in a column of "Personal Information" table. Inmate's information, legal name "John Rendell Smith", ID number "1", birthday "01/01/1975", PIN "54321", SSN "123-45-6789", is arranged in a row in the "Personal Information" table. Another inmate's information, legal name "Jack Bauer", ID number "2", birthday "02/18/1966", PIN "45321", SSN "213-45-6789", is arranged in another row below "John Rendell Smith", in the "Personal Information" table.

The registered biometric samples of inmates "John Rendell Smith" and "Jack Bauer" are stored in rows in "Biometric Sample" table. "John Rendell Smith" has registered voice sample "VS-JRS", registered fingerprint "FP-JRS", and registered retinal scan sample "RS-JRS". "Jack Bauer" has registered voice sample "VS-JB", registered fingerprint "FP-JB", and registered retinal scan sample "FP-JB". The biometric information of each inmate is associated with the inmate through SSN.

The contact lists of "John Rendell Smith" and "Jack Bauer" are stored in rows in "Contact List" table. "John Rendell Smith" is associated with, through his SSN, contact 1 "Mom" and contact 2 "Aunty Lily". Contact "Mom', related to inmate as "parent", is associated with a customized audio file containing the voice of "Smitty" and a customized text file containing the text of "Smitty". Contact "Aunty Lily", related to inmate as "relative", is associated with a customized audio file containing the voice of "Johnny", a customized text file containing the text of "Johnny", and a media file containing a video of "Happy Birthday, Aunty Lily". "Jack Bauer" is associated with, through his SSN, contact 1 "Daughter". Contact 1 "Daughter', related to inmate as "child", is associated with a customized audio file containing the voice of "dad".

In an embodiment, when inmate "John Rendell Smith" sends a contact request for a call to "Mom", he is prompted to provide his SSN and a biometric input, e.g., voice input, to communication control center 102. Analysis engine 201, i.e., the analysis server 205, is routed to database 202 to search for the profile information of "John Rendell Smith". Analysis server 205 locates an inmate named "John Rendell Smith" in the "Personal Information" table having the matching SSN and is pointed to, through the SSN, a voice sample, in the "Biometric Sample" table that matches the voice input. The identity of "John Rendell Smith" is authenticated.

Further, analysis engine 201 locates the contact list associated with "John Rendell Smith" in the "Contact List" table, and returns all the customized audio files, text files, and media files associated with contact "Mom", to "John Rendell Smith". The customized files and related options are displayed on telephonic instrument 105 3, a kiosk. "John Rendell Smith" can choose one or more customized files or decline to choose any customized files.

In another embodiment, "John Rendell Smith" initiates a contact request by pressing a designated button on kiosk 105 3. The analysis engine 201 of communication control center 102 receives the contact request and prompts "John Rendell Smith" to authenticate his identity. After his identity is authenticated, analysis engine 201 locates the contact list associated with "John Rendell Smith" in "Contact List" table, and returns all the existing contacts to "John Rendell Smith". "John Rendell Smith" can choose a desired contact and, optionally, desired customized files, from the kiosk 105 3.

In another embodiment, "John Rendell Smith" initiates a contact request by dialing a new number. After the call is completed, "John Rendell Smith" has the option to store the new phone number and any customized files into the "Contact List" table, through the kiosk 105 3. Analysis engine 201 locates a row in "Contact List" table and writes the inputted information into the suitable columns.

In another embodiment, "Contact List" table further includes a "Number of Calls in the Past 2 weeks" column, and/or a "Contact Security Level" column. The "Number of Calls in the Past 2 weeks" column automatically records the number of calls the inmate has made to a contact during a particular time period, and the "Contact Security Level" column contains security level of the contact. For example, if the number of calls the inmate makes to a phone number is too high, the analysis engine 201 sends an alert to the authorized officers/staff to start an investigation if needed. A contact can be flagged as "normal", "abnormal", and/or "dangerous", in the "Contact Security Level" column, based on the investigation result.

In various embodiments of the present disclosure, terms "called party" and "contact" are interchangeable. A "user" can refer to any suitable person using an instrument, such as an officer or an inmate. Term "telephonic instrument" can refer to any suitable device that has a calling function. For example, a telephonic instrument can include a wireless device, a tablet, a kiosk, a conventional phone, a computer, etc.

System Operations

Operations of choosing customized inmate communication notification in inmate communication notification customizing system 100 will be described with respect to FIGS. 3, 4 and 5. Although the physical devices and components that form the system have largely already been described, additional details regarding their operations will be described below with respect to FIGS. 1, 2A, 2B and 2C. While FIGS. 3, 4 and 5 contain methods of operation of inmate communication notification customizing system 100, the operations are not limited to the order described below, and various operations can be performed in a different order. Further, two or more operations of each method can be performed simultaneously with each other.

Figure 3:
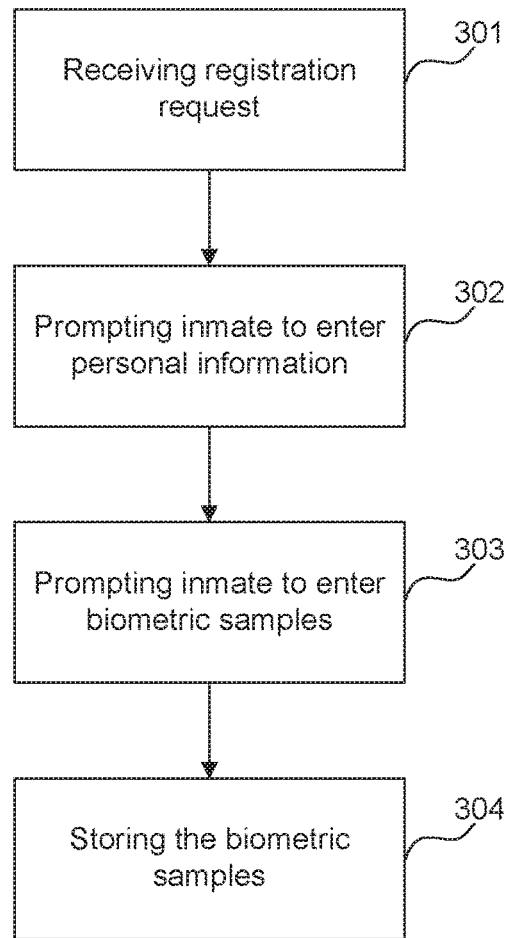
FIG. 3 illustrates a flowchart diagram of a method for registration with the communication control center, according to embodiments of the present disclosure.

FIG. 3 illustrates a flowchart diagram of a method 300 of registering inmate information in communication control center, according to embodiments of the present disclosure. An inmate can register in communication control center from a plurality of telephonic instruments. Optionally, authorized officers/staff in controlled environment supervise the registration processes. The registration process includes storing one or more biometric samples of the inmate into communication control center such that the registered biometric samples are correlated with identity of the inmate.

In step 301, communication control center receives a registration request from an inmate, through a telephonic instrument. In step 302, communication control center prompts the inmate to enter suitable personal information, e.g., SSN and/or birthday, to authenticate the identity/registration of the inmate. In step 303, after the inmate's registration has been authenticated, communication control center prompts the inmate to enter one or more biometric samples. In step 304, after receiving and analyzing the biometric samples, communication control center stores the biometric samples in the database, associated with personal information and other information of the inmate.

In some embodiments, for security considerations, an inmate can only register biometric samples on certain telephonic instruments with surveillance functions or under the supervision of authorized officers/staff. In an embodiment, a permission from an authorized office is required to be entered with the personal information of the inmate, to authenticate the identity of the inmate.

Figure 4:
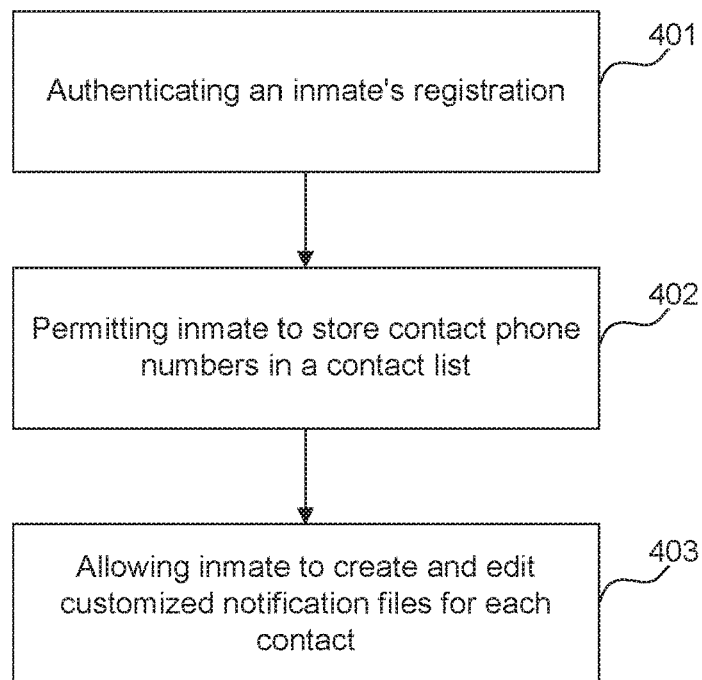
FIG. 4 illustrates a flowchart diagram of a method for customizing files in the communication control center, according to embodiments of the present disclosure.

FIG. 4 illustrates a flowchart diagram of a method 400 of creating customized files associated with a contact. An inmate can create and store customized files in communication control center from telephonic instruments.

In step 401, communication control center receives a biometric input that matches a registered biometric sample of an inmate stored in communication control center so that the registration/identity of the inmate is authenticated. In step 402, communication control center permits the inmate to enter one or more contact phone number through the telephonic instrument and stores the contact phone numbers in a contact list. The inmate names the contacts without violating any security protocols. In step 403, communication control center provides the inmate an option to create and edit customized audio files, text files, and media files associated with each contact name.

In various embodiments, the contact names and customized files are automatically parsed and analyzed by communication control center. If any violation to security protocol is detected, communication control center sends an alert to authorized officers/staff and/or declines the input by the inmate.

Figure 5:
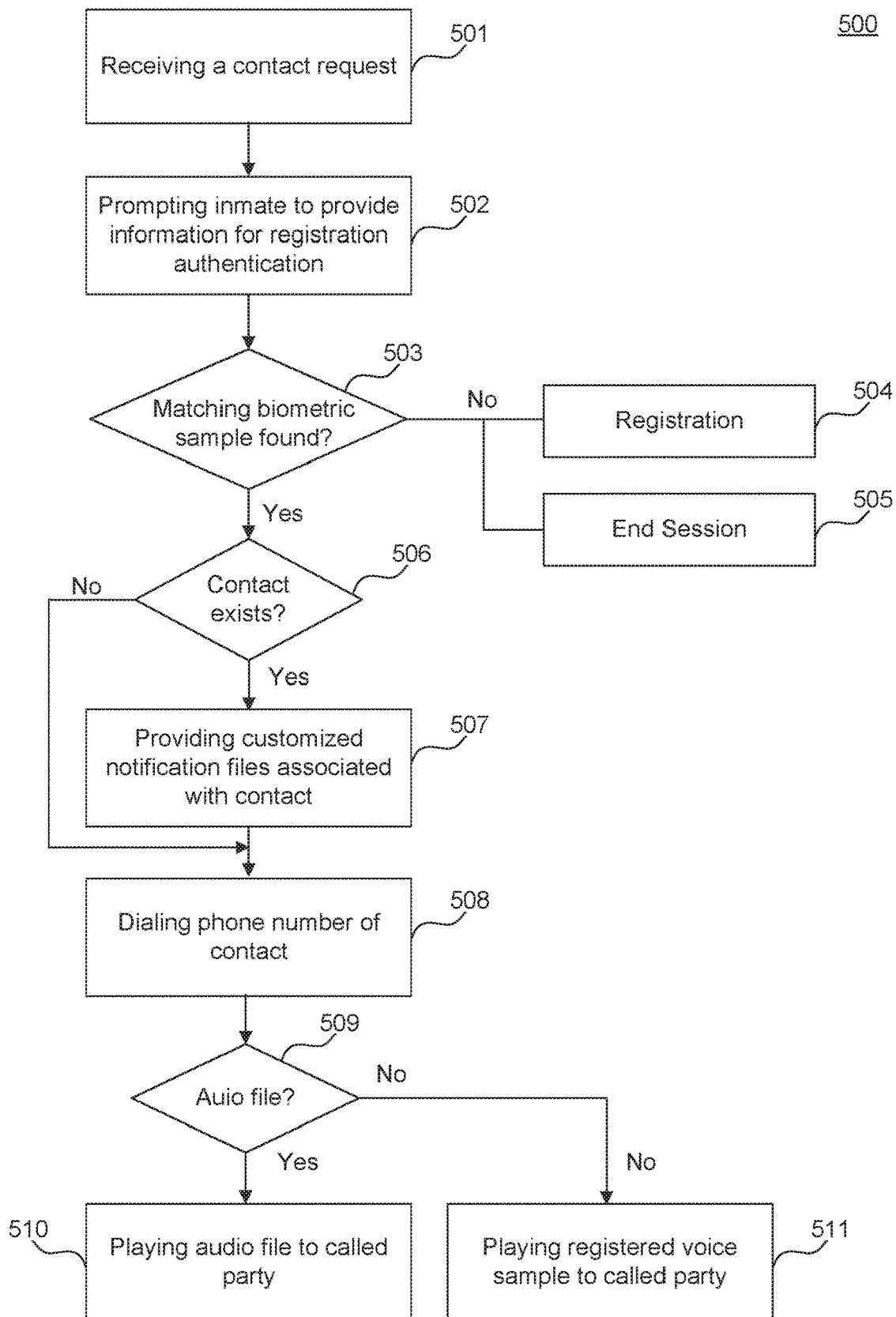
FIG. 5 illustrates a flow chart diagram of a method for choosing customized files for a called party, according to embodiments of the present disclosure.

FIG. 5 illustrates a flowchart diagram of a method 500 of choosing customized files to be played to a called party.

In step 501, communication control center receives a phone number dialed by an inmate, through a telephonic instrument in the controlled environment. After receiving the contact request, in step 502, communication control center prompts the inmate to provide one or more of personal information and biometric samples to authenticate the inmate's identity/registration. After receiving the inmate's input, in step 503, communication control center searches registration information in database and determines whether the inmate's input matches any of registered personal information and registered biometric samples. If no match is found, communication control center provides inmate the options to register in step 504, or end session step 506. If a match is found, in step 506, communication control center determines whether the phone number is an existing contact number or is a new number. If the phone number already exists, the process proceeds to step 507. If the phone number is new, the process proceeds to step 508.

In step 507, communication control center provides inmate the options to choose from customized audio files, text files, and media files, or decline choosing any customized files. After the inmate has made his/her choices, in step 508, communication control center dials the phone number provided by the inmate and determines whether a customized audio file is chosen in step 509. A customized text file, if chosen, is displayed on the telephonic instrument associated with the phone number. After the called party answers the call, if a customized audio files is chosen, in step 510, the communication control center plays a call announcement containing the customized audio file; if no customized audio file is chosen, in step 511, the communication control center plays a call announcement containing the registered voice sample of the inmate.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
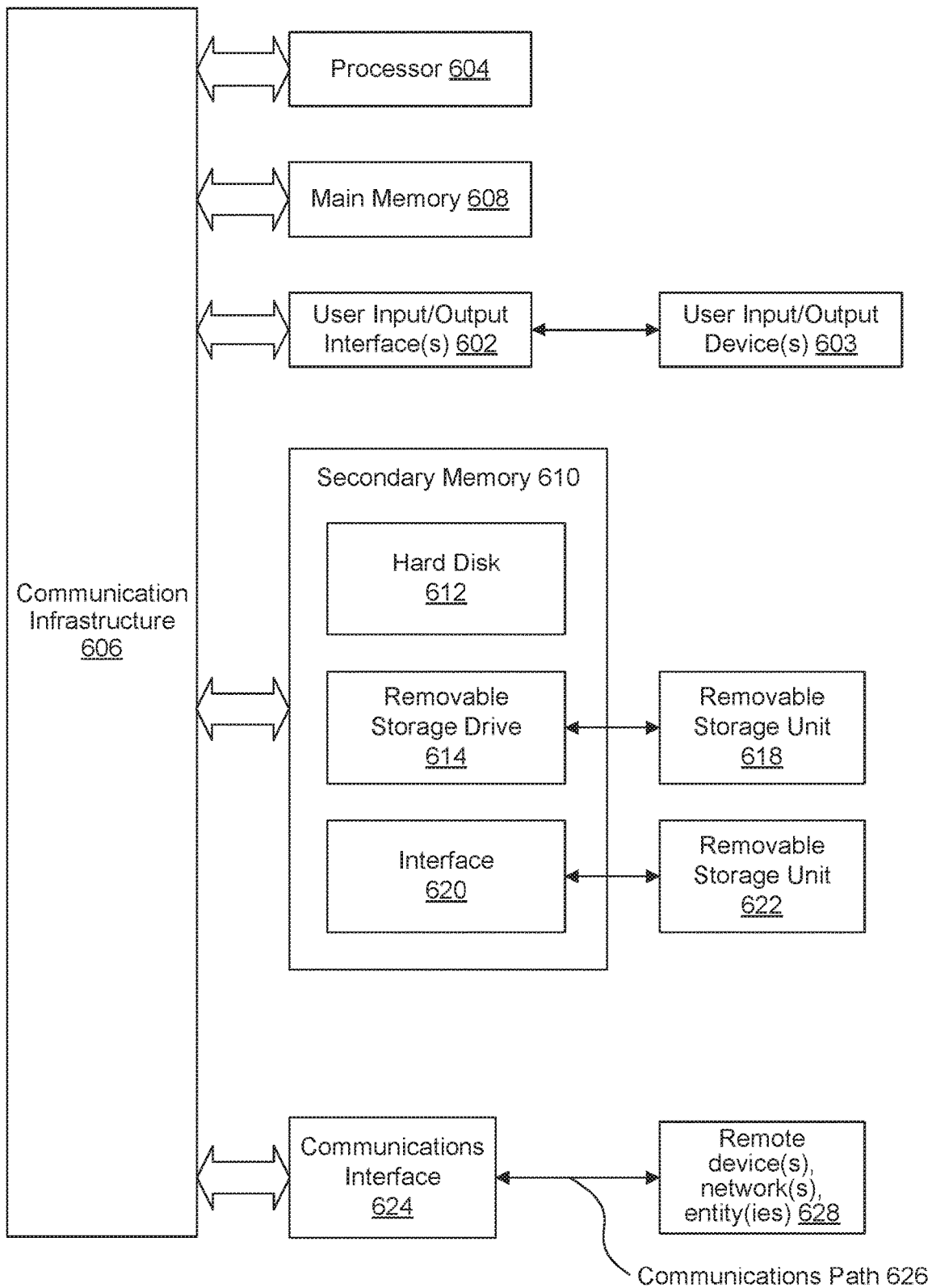
FIG. 6 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the communication control center and analysis engine of FIGS. 2A-2C and the methods of FIGS. 3-5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 606 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, or the like. Removable storage drive 614 reads from and/or writes to a removable storage unit 618 in a well-known manner. Removable storage unit 618 represents a floppy disk, magnetic tape, optical disk, or the like, which is read by and written to by removable storage drive 614. As will be appreciated by persons skilled in the relevant art(s), removable storage unit 622 includes a computer usable storage medium having stored therein computer software and/or data.

In alternative implementations, secondary memory 610 can include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, a thumb drive and USB port, and other removable storage units 622 and interfaces 620 which allow software and data to be transferred from removable storage unit 622 to computer system 600.

Computer system 600 also includes user input/out interface(s) 602 which provide an interface to user input/output device(s) 603. Such user input/output device(s) 603 may be any device that provides a user access to input and output of computer system 600. Examples of user input/output device(s) 603 may include a keyboard, a computer monitor, a mouse, a camera, and a microphone.

Computer system 600 also includes a communications interface 624. Communications interface 624 allows software and data to be transferred between computer system 600 and external devices 628 which can include remote device(s), other network(s), and other entities. Examples of communications interface 624 can include a modem, a network interface (such as an Ethernet card), a communications port, a PCMCIA slot and card, etc. Software and data transferred via communications interface 624 are in the form of signals which can be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 618 and 622 or a hard disk installed in hard disk drive 612. These computer program products are means for providing software to computer system 600.

Computer programs (also called computer control logic) are stored in main memory 608 and/or secondary memory 610. Computer programs can also be received via communications interface 624. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 614, interface 620, or communications interface 624.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A communication platform, comprising:
    a database that stores a user profile; and
    one or more processors configured to:
        generate customized contact notification messages associated with different contacts with which a user is permitted to communicate and different communication types;
        detect an outgoing call to a call recipient initiated by the user associated with the user profile;
        determine a contact number associated with the call recipient;
        retrieve a customized contact notification message associated with the call recipient and corresponding to the contact number of the call recipient;
        detect that the outgoing call has been answered; and
        provide the retrieved customized contact notification message in response to the detecting.

2. The communication platform of claim 1, wherein to generate of the
    customized contact notification messages, the one or more processors are configured to:
        receive a contact identifier from the user that identifies a contact with which the user is permitted to communicate;
        receive a plurality of notification selections from the user, each of the plurality of notification selections corresponding to a different communication type; and
        update the user profile in the database based on the received plurality of notification selections.

3. The communication platform of claim 2, the one or more processors further configured to:
    determine a type of communication attempt; and
    identify one of the plurality of notification selections stored in the user profile corresponding to the type of the communication attempt.

4. The communication platform of claim 3, wherein the plurality of notification selections include a first notification selection for a first communication type and a second notification selection for a second communication type.

5. The communication platform of claim 4, wherein the first communication type is a telephonic communication.

6. The communication platform of claim 4, wherein the second communication type is one of a text message communication or an email communication.

7. The communication platform of claim 1, wherein the customized contact notification message includes a nickname of the contact.

8. A method, comprising:
    storing a user profile in a database;
    generating customized contact notification messages associated with different contacts with which a user is permitted to communicate and different communication types;
    detecting an outgoing call to a call recipient initiated by the user associated with the user profile;
    determining a contact number associated with the call recipient;
    retrieving a customized contact notification message associated with the call recipient and corresponding to the contact number of the call recipient;
    detecting that the outgoing call has been answered; and
    providing the retrieved customized contact notification message in response to the detecting.

9. The method of claim 8, wherein the generating of the customized contact notification messages includes:
    receiving a contact identifier from the user that identifies a contact with which the user is permitted to communicate;
    receiving a plurality of notification selections from the user, each of the plurality of notification selections corresponding to a different communication type; and
    updating the user profile in the database based on the received plurality of notification selections.

10. The method of claim 9, further comprising:
    determining a type of communication attempt; and
    identifying one of the plurality of notification selections stored in the user profile corresponding to the type of the communication attempt.

11. The method of claim 10, wherein the plurality of notification selections include a first notification selection for a first communication type and a second notification selection for a second communication type.

12. The method of claim 11, wherein the first communication type is a telephonic communication.

13. The method of claim 12, wherein the second communication type is one of a text message communication or an email communication.

14. The method of claim 8, wherein the customized content notification message includes a nickname of the contact.

15. A non-transitory computer-readable medium, having stored thereon, instructions that when executed by a computing device, cause the computing device to perform operations comprising:
    storing a user profile;
    generating customized contact notification messages associated with different contacts with which a user is permitted to communicate and different communication types;
    detecting an outgoing call to a call recipient initiated by the user associated with the user profile;
    determining a contact number associated with the call recipient;
    retrieving a customized contact notification message associated with the call recipient and corresponding to the contact number of the call recipient;
    detecting that the outgoing call has been answered; and
    providing the retrieved customized contact notification message in response to the detecting.

16. The non-transitory computer-readable medium of claim 15, wherein the generating of the
    customized contact notification messages includes:
        receiving a contact identifier from the user that identifies a contact with which the user is permitted to communicate;
        receiving a plurality of notification selections from the user, each of the plurality of notification selections corresponding to a different communication type; and
        updating the user profile in a database based on the received plurality of notification selections.

17. The non-transitory computer-readable medium of claim 16, the operations further comprising:
    determining a type of communication attempt; and
    identifying one of the plurality of notification selections stored in the user profile corresponding to the type of the communication attempt.

18. The non-transitory computer-readable medium of claim 17, wherein the plurality of notification selections include a first notification selection for a first communication type and a second notification selection for a second communication type.

19. The non-transitory computer-readable medium of claim 18, wherein the first communication type is a telephonic communication, and
wherein the second communication type is one of a text message communication or an email communication.

20. The non-transitory computer-readable medium of claim 15, wherein the customized content notification message includes a nickname of the contact.

* * * * *

UNITED STATES PATENT AND TRADEMARK OFFICE
CERTIFICATE OF CORRECTION

PATENT NO. : 12,166,891 B2  
APPLICATION NO. : 18/195576  
DATED : December 10, 2024  
INVENTOR(S) : Hodge Page 1 of 1

It is certified that error appears in the above-identified patent and that said Letters Patent is hereby corrected as shown below:

In the Claims

In Column 21, Claim 2, Line 21, after "generate" delete "of".

In Column 21, Claim 2, Lines 22-23, delete "customized contact notification messages, the one or more processors are configured to:" and insert the same on Line 21, after "the" as a continuation point.

Signed and Sealed this  
Nineteenth Day of August, 2025

Coke Morgan Stewart  
*Acting Director of the United States Patent and Trademark Office*